United States Patent
Schulz

[15] 3,701,292
[45] Oct. 31, 1972

[54] MULTIPLE SPEED HUB WITH AUTOMATIC GEAR CHANGE AND MANUAL OVERRIDE

[72] Inventor: Horst Schulz, Schweinfurt, Germany

[73] Assignee: Eichtel & Sachs AG, Schweinfurt, Germany

[22] Filed: Nov. 17, 1970

[21] Appl. No.: 90,398

[30] Foreign Application Priority Data

Dec. 24, 1969 Germany..........P 19 64 866.9

[52] U.S. Cl. ..............................................74/752 E
[51] Int. Cl................................................F16h 5/46
[58] Field of Search ...................................74/752 E

[56] References Cited

UNITED STATES PATENTS

| | | |
|---|---|---|
| 3,608,398 | 9/1971 | Segawa et al..............74/752 E |
| 1,919,876 | 7/1933 | Mielke et al...............74/752 E |
| 2,132,728 | 10/1938 | Ford et al..................74/752 E |
| 3,492,893 | 2/1970 | Shimano et al...........74/752 E |
| 3,592,081 | 7/1971 | Schwerdhofer..........74/752 E |

Primary Examiner—William L. Freeh
Assistant Examiner—Thomas C. Perry
Attorney—Kelman & Berman

[57] ABSTRACT

A dual speed bicycle hub with a planetary gear transmission and automatic gear shift operated by a centrifugal governor is additionally equipped with a manual override permitting manual speed selection while movement of the flyweights in the governor under the influence of centrifugal forces is blocked. The manual controls may hold the flyweights near or remote from the axis of hub rotation and thereby engage or disengage an overrunning clutch which connects a fast-moving transmission element to the hub shell.

12 Claims, 11 Drawing Figures

MULTIPLE SPEED HUB WITH AUTOMATIC GEAR CHANGE AND MANUAL OVERRIDE

This invention relates to multiple speed hubs for bicycles and like vehicles which are equipped with a centrifugal governor for automatic change of transmission ratio and a manual override for selecting the transmission ratio regardless of the condition of the governor, and more particularly to an improvement in the multiple speed hub disclosed in the commonly owned application of Hans Joachim Schwerdhöfer, Ser. No. 16,920, filed on Mar. 5, 1970, now Pat. No. 3,592,081.

While the apparatus of the earlier application is effective, it is relatively complex and accordingly costly to build and subject to failure due to wear after a limited useful life.

The primary object of the instant invention is the provision of a manual override arrangement which is simpler, inexpensive to build, and rugged for a long useful life. As in the earlier invention, the manual override is combined with a basically conventional multiple-speed hub for a bicycle and the like which has a driver member rotatable about an axis of rotation, a hub shell member, and a multiple-speed transmission operatively interposed between the two members. The transmission includes two transmission elements rotating at different speeds during rotation of the driver member and two clutches interposed between the transmission elements respectively and the hub shell member for rotating the latter about the axis of rotation at either one of the two different speeds.

A centrifugal governor includes a flywheel connected to the driver member or the hub shell member for simultaneous rotation about the afore-mentioned axis and for movement of the center of gravity of the flyweight toward and away from the axis between two radial positions under centrifugal forces. The governor shifts one of the clutches between an engaged condition and a disengaged condition in response to radial movement of the flyweight, and the governor may be deactivated by a manual override mechanism when the latter shifts the one clutch between its conditions.

The improvement in the manual override mechanism with which this invention is more specifically concerned contributes a sleeve member which is movable relative to the flyweight between a plurality of axial positions and is drivingly coupled to either the driver member or the hub shell member for rotation about the common axis at a rotary speed different from the speed of rotation of the flyweight. An abutment member is mounted on the sleeve member in frictional engagement with the same and may be engaged with an abutment on the flyweight during relative angular movement of the sleeve member and the flyweight while the sleeve member is in one of its axial positions, thereby preventing radial movement of the flyweight and holding the one clutch in one of its conditions, which may be either the engaged or the disengaged position.

Other features, additional objects, and many of the attendant advantages of this invention will readily become apparent as the same becomes better understood by reference to the following detailed description of preferred embodiments when considered in connection with the appended drawings in which.

Figure 1:
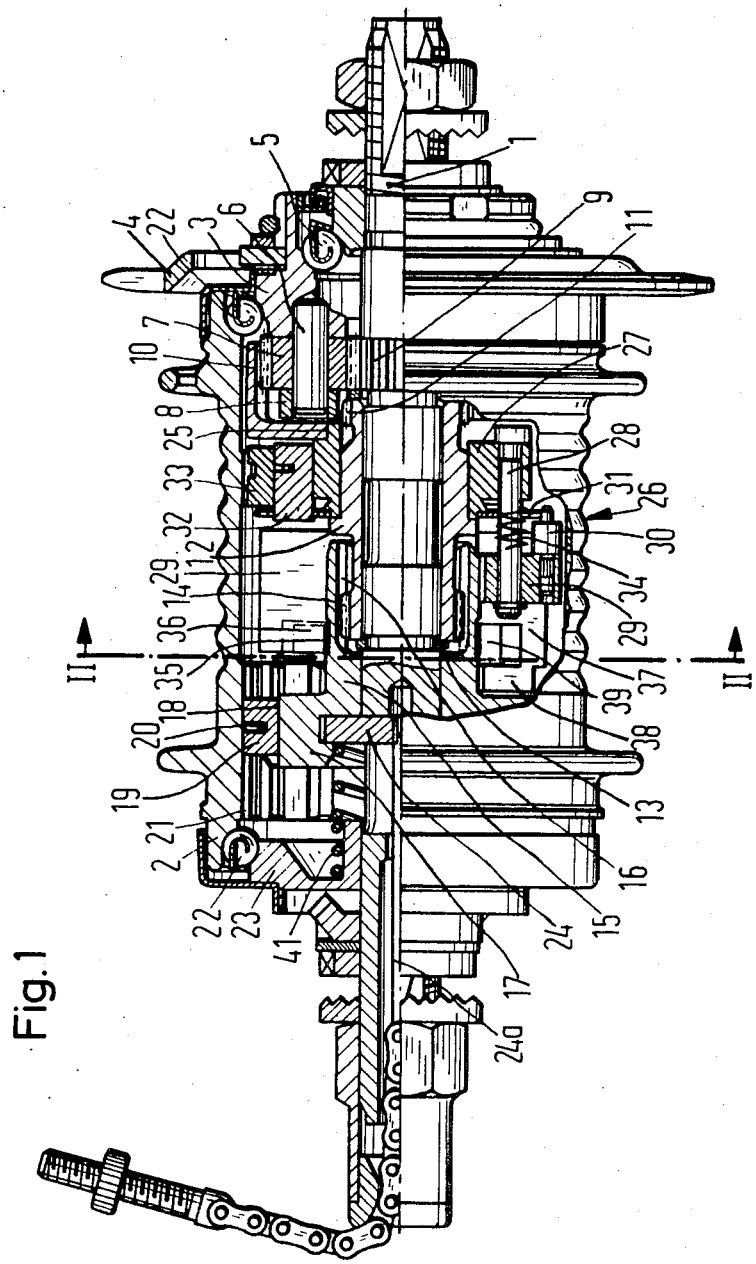
FIG. 1 shows a multiple-speed hub of the invention in rear elevation and partly in section.

Referring initially to FIGS. 1 to 4, there is seen a multiple-speed hub for a bicycle whose external appearance is conventional. A shaft 1, normally fixedly fastened in the bicycle frame, is coaxially enveloped by a hub shell 2 to which a wheel rim is attached by wire spokes in a manner not illustrated. A driver 3 partly projects from the hub shell 2 and carries a sprocket 4 for a drive chain, not shown.

The portion of the driver 3 concealed in the hub shell is rotatably supported on the shaft 1 by means of a ball bearing 5 and serves as a planet carrier for a planetary gear transmission in the hub shell. Three planet shafts 6 are equiangularly spaced about the hub axis on the driver 3 and carry respective planet gears 7, only one shaft 6 and gear 7 being visible in the drawing. The three planet gears 7 are secured in their axial positions by a common flat ring 8 fixed on the free ends of the shafts 6.

The planet gears 7 simultaneously mesh with a sun gear 9 fixed on or integral with the shaft 1, and with an enveloping ring gear 10. Interengaged splines or ribs 11 on the ring 8 and on a sleeve 12 fixedly connect the sleeve 12 to the ring 8 in the assembled condition of the apparatus, the sleeve 12 being axially secured by a guard ring 13 set into a circumferential groove of the shaft 1 at the end of the sleeve 12 axially remote from the planetary gearing and the driver 3.

The last-mentioned axial end of the sleeve 12 carries axial ribs 14 which are interengaged with longer ribs 16 on the hub or sleeve portion 15 of a pawl carrier so as to secure the sleeve 12 and the pawl carrier to each other for joint rotation while permitting axial movement of the pawl carrier. A flange portion 17 of the pawl carrier has two diametrically opposite, radially open pockets 18 in which respective pawls 19 are pivotally received and biased by an annular wire spring 20 toward engagement with the long, axial ribs of a ratchet rim 21 on the hub shell 2, the two axial ends of the latter being rotatably supported by two ball bearings 22 on the driver 3 and a bearing ring 23 respectively, the ring 23 being fixed on the shaft 1 in the assembled hub.

The pawl carrier 15, 17 may be shifted axially on the shaft 1 by means of a slide 24 which projects from an axial bore of the shaft 1 through a radially open axially elongated slot in the shaft into a circumferential groove of the flange portion 17 which is open in a radially inward direction. The slide 24 is normally held at the end of the associated slot nearest the driver 3 by a helical compression spring 41 coiled about the shaft 1, and may be displaced against the restraint of the spring 41 by an attached pull rod 24a in the axial bore of the shaft 1, the pullrod being manually operated by the rider of the bicycle by means of a linkage including a chain and a Bowden cable leading to a control device on the handlebars or the frame of the bicylce, only the chain being seen in the drawing.

A centrifugal governor 26 arranged in the hub shell 2 axially between the planetary gearing and the pawl carrier 15, 17 includes an annular flyweight carrier 27 movably mounted on the sleeve 12 and coupled to the ring gear 10 by interengaged projections and recesses 25. Two axial pivot pins 28 secure respective end portions of elongated, arcuate flyweights 29 to the carrier 27 for movement of the free end portions of the weights toward and away from the position nearest the sleeve portion 15 and the shaft 1 shown in FIG. 2. Axial control pins 30 on the flyweights 29 are offset from the pivot pins 28 in a radially outward direction and engage conforming openings in a control disc 31 in a manner more fully described in the aforementioned commonly owned application.

Apertures in the disc 31 receive respective axial ends of two pawls 32 pivotally mounted in peripheral pockets of the flyweight carrier 27 in the manner described above with reference to the pawls 19. Cam faces of the disc 31, not shown, which bound the apertures may pivot the pawls away from a ratchet ring 33 fixed on the hub shell 2 against the restraint of a non-illustrated pawl spring which engages the pawls with the ring 33 when the pawls are released by the disc 31. Helical torsion springs 34, much stronger than the non-illustrated pawl spring, bias the flyweights 29 toward the position shown in FIG. 2, and are overcome by centrifugal forces at adequate rotary speeds of the flyweight carrier 27.

An annular leaf spring 35 frictionally engages the hub or sleeve portion 15 of the pawl carrier in a circumferential groove of the latter. An end portion 36 of the spring is bent radially outward for cooperation with the flyweights 29. Each flyweight has an integral axial projection 37 spacedly adjacent the pins 28, 30 whose free end 38 is bent over toward the axis of the hub to form a hook shape which defines a pocket 39 with the flyweight body. The pocket 39 is open circumferentially and in a radially inward direction as is also seen in the modified flyweight illustrated in FIG. 11. The free end of each flyweight carries an axially projecting cam 40.

Figure 2:
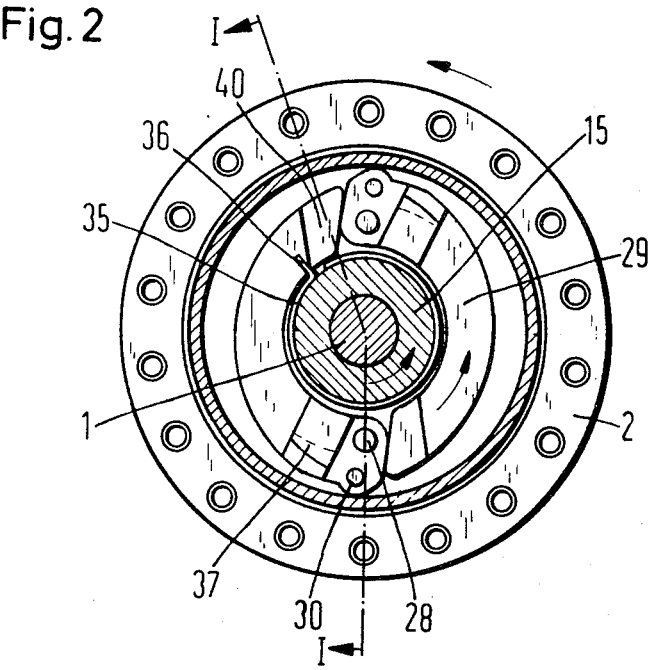
FIG. 2 illustrates the hub of FIG. 1 in section on the line II—II.

The dual-speed hub of FIGS. 1 and 2 is operated as follows:

In the position of the hub elements shown in FIG. 1, the slide 24 is held by the spring 41 in its terminal axial position, whereby the spring 35 on the pawl carrier portion 15 is radially aligned with the pocket 39 in the hook-shaped projection 37. The governor 26 turns with the ring gear 10 relative to the pawl carrier 15, 17 which is coupled by the sleeve 12 to the slower moving driver 3. The free end 36 of the spring 35 therefore can move through the pocket 39 into abutting engagement with the cam 40 at one end of a flyweight 29 and retain the flyweight near the shaft 1 regardless of centrifugal forces that may act on it. The spring 35 slips on the pawl carrier 15, 17. The two flyweights 29 are coupled by the control pins 30 and the disc 31 so that the flyweight 29 not directly engaged by the spring portion 36 also is retained near the axis of rotation.

In this position of the flyweights, the pawls 32 on the carrier 27 are held out of engagement with the ratchet ring 33 on the hub shell 2, and torque is transmitted from the sprocket 4 to the hub shell 2 by the pawls 19 on the pawl carrier 15, 17 which rotate at the same speed as the sprocket 4. The hub operates at the lower one of its two transmission ratios regardless of its rotary speed.

Figure 4:
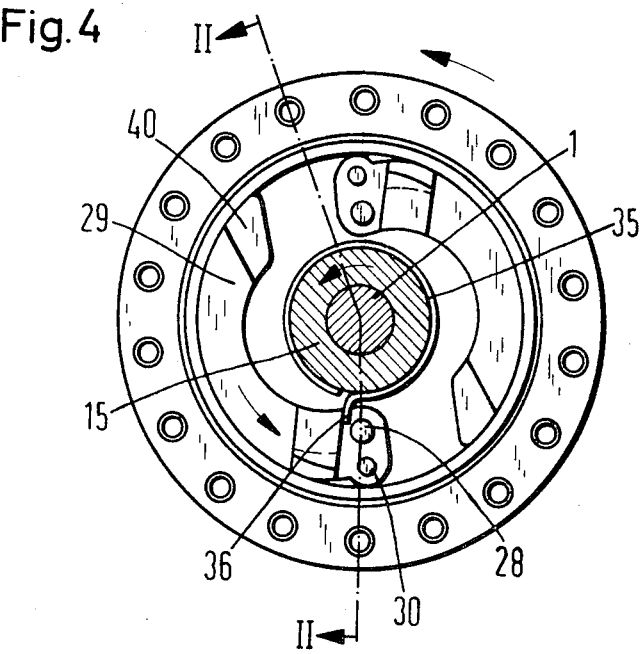
FIG. 4 is a radially sectional view of the hub of FIG. 3 taken on the line IV—IV.
Figure 3:
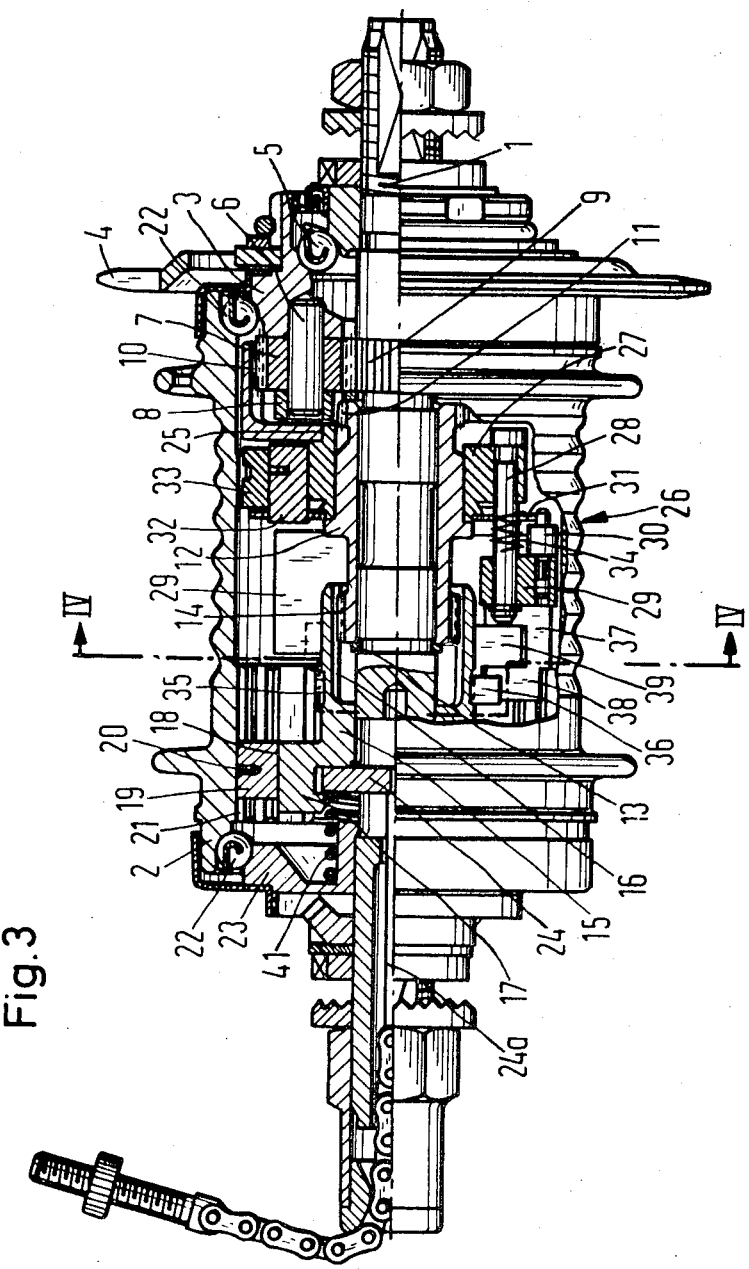
FIG. 3 shows the apparatus of FIG. 1 in another operative position.

When the slide 24 is shifted by the rod 24a and associated non-illustrated elements on the handle bars or the frame of the bicycle axially away from the driver 3 into the intermediate position shown in FIG. 3, the radial end portion 36 of the spring portion 35 abuts against the free end 38 of a hook shaped projection 37, and pivots the engaged flyweight 29 and the coupled other flyweight away from the hub axis into the position seen in FIG. 4, the friction between the spring 35 and the pawl carrier portion 15 being adequate for overcoming the restraining force of the return springs 34 even when the hub does not rotate.

The flyweights turn the control disc 31 so that it releases the pawls 32, and the latter engage the ratchet ring 33 on the hub shell 2. The shell is thereby driven at the higher rotary speed of the ring gear 10, and the ratchet rim 21 overruns the pawls 19. The hub operates at its higher transmission ratio regardless of its rotary speed.

When the rod 24a is pulled out of the shaft 1 to the limit of movement of the slide 24, the terminal spring portion 36 axially clears the flyweights 29 and their hook-shaped projections 37 so that it no longer impedes the operation of the centrifugal governor 26. The flyweights move between the positions of FIGS. 2 and 4 depending on the balance between the centrifugal forces due to rotation of the ring gear 10 and the restraining force of the return springs 34. The hub shell 2 is driven at a transmission ratio which changes automatically with the rotary speed of the sprocket 4.

The dual speed hub of the invention seen in FIGS. 5 to 11 is identical with that described above except for the configuration of its two flyweights 46 and the length of the pivot pins 45 which secure the flyweights to the flyweight carrier 27. The unchanged elements are indicated in FIGS. 5–11 by the same numerals as in FIGS. 1–4 and will not be described again.

Figure 6:
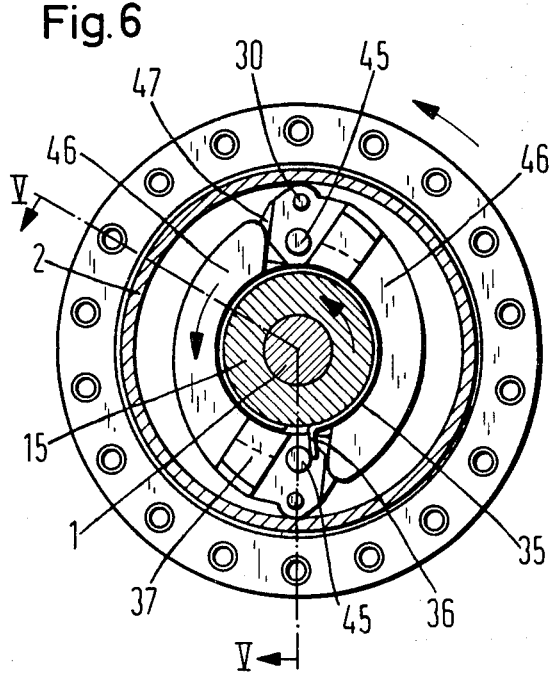
FIG. 6 illustrates the device of FIG. 5 in section on the line VI—VI.
Figure 7:
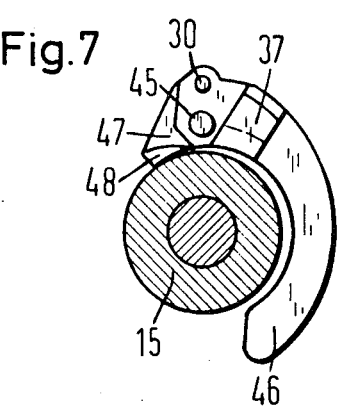
FIG. 7 shows a flyweight of the device of FIG. 6 in a corresponding view.
Figure 8:
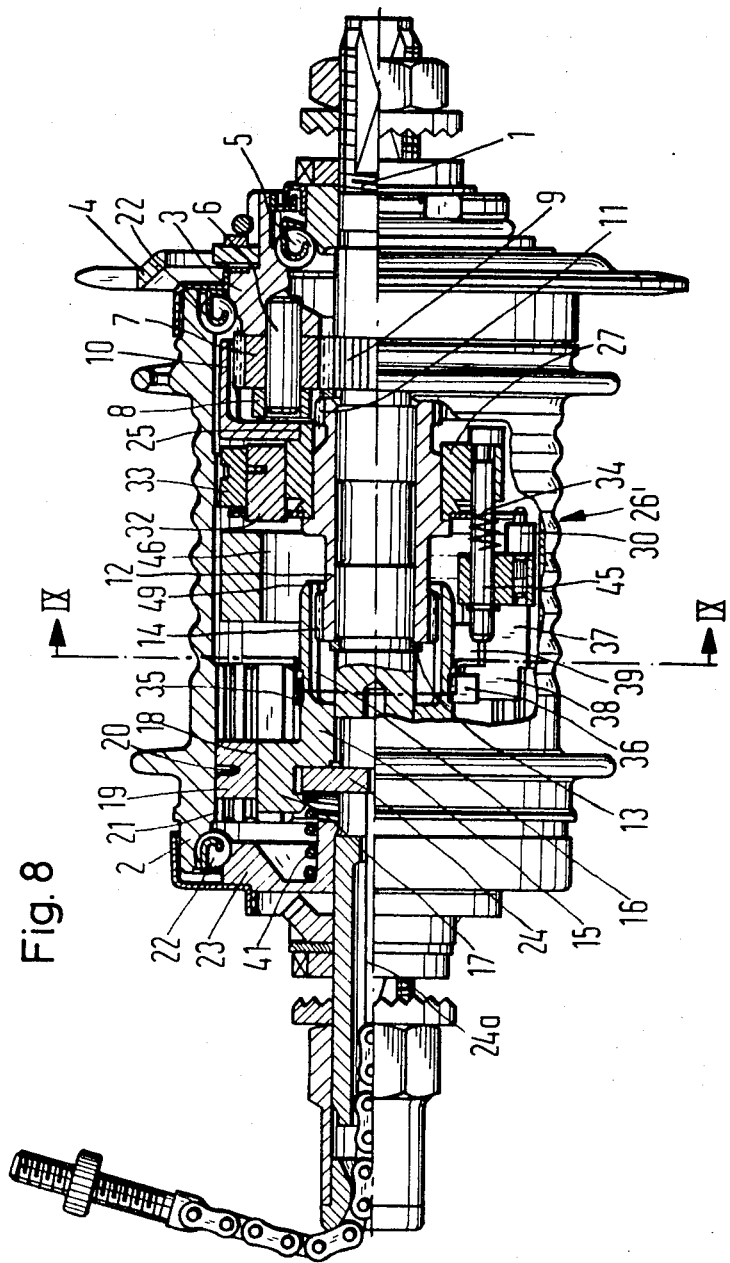
FIG. 8 shows the multiple-speed hub of FIG. 5 in another operating condition.
Figure 10:
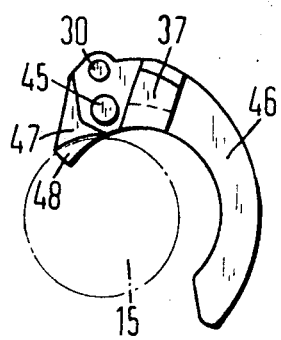
FIG. 10 shows a flyweight of the apparatus of FIG. 9.
Figure 11:
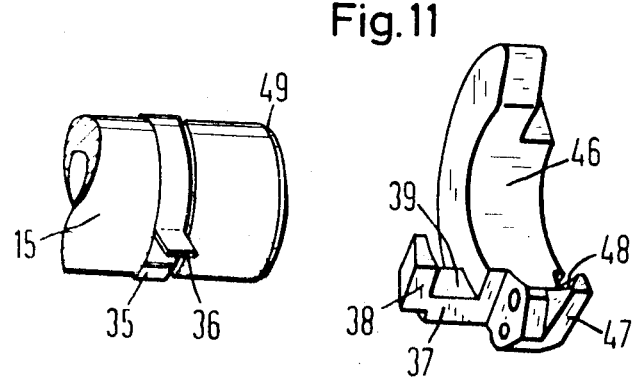
FIG. 11 illustrates elements of the apparatus of FIGS. 5 to 10 in a perspective, exploded view.

As is best seen in FIGS. 7 and 10, the flyweights have each an inner face of circularly arcuate configuration, only slightly greater in radius than the outer face of the sleeve portion 15 of the pawl carrier, and extending about the hub axis in an arc of more than 180° in the retracted position of the flyweights shown in FIGS. 6 and 7. Each flyweight has a spur 47 which extends counterclockweise from the associated pivot pin 45, as viewed in FIGS. 6 and 7, whereas the main portion of the other flyweight, the spur and the free end of each flyweight are of reduced axial thickness and axially offset, as is best seen in FIG. 11. Moreover, an oblique cam face 48 on the spur 47 of each flyweight further prevents clashing of the two flyweights as they approach the hub axis. Each flyweight is provided with a hook-shaped projection 37 about a pocket 39 as described with reference to FIGS. 1 to 4.

Figure 5:
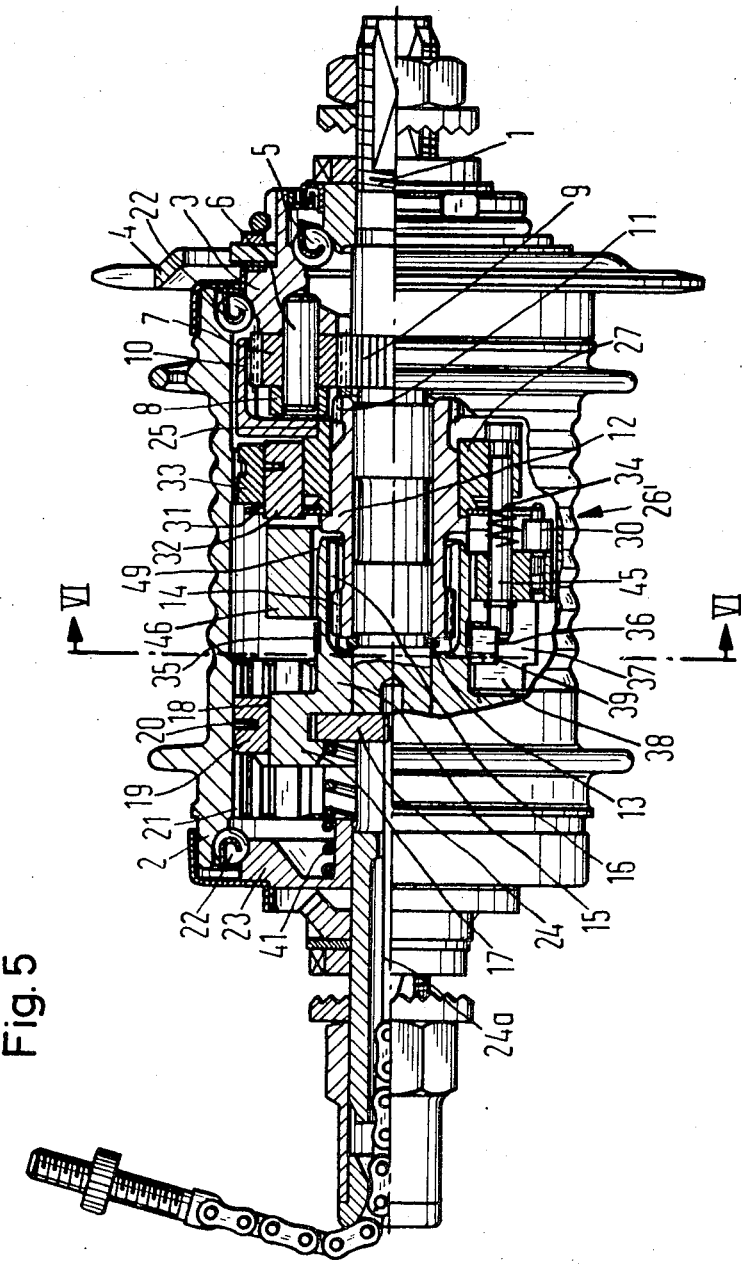
FIG. 5 shows a modified embodiment of the invention in a view corresponding to that of FIG. 1.

In the position of the apparatus illustrated in FIGS. 5 to 7, the sleeve portion 15 of the pawl carrier 15, 17 is at the end of its axial stroke near the driver 3 and approximately coaxially received within the inner faces of the flyweights. Centrifugal forces tending to pivot the flyweights 46 on the pins 45 cause the spurs 47 to ride on the slower moving outer face of the sleeve portion 15, as is shown in FIG. 7, and radially abutting engagement of the spur with the sleeve portion holds the flyweights near the hub axis, thereby causing disengagement of the pawls 32 from the ratchet ring 33, and rotation of the hub shell 2 at the relatively low rotary speed of the sprocket 4.

In the aforedescribed position of the sleeve portion 15, the end portion 36 of the spring 35 passes freely through the pocket 39 in the hook-shaped projection 37, but the free ends of the long pivot pins are located in the path of the spring portion 36, so that the spring portion abuts circumferentially against one of the pins 45 and the spring 35 slips on the sleeve portion 15 as described above. When the pull rod 24a is shifted by means of the non-illustrated manual controls into the position seen in FIG. 8 and corresponding to that of FIG. 3, the spring portion 36 clears the engaged pin 45 only after the spring portion is aligned with the hook portion 38. The spring 35 cannot be distorted accidentally by axial movement of the pawl carrier portion 15 while the spring portion 36 is located in the pocket 39.

Figure 9:
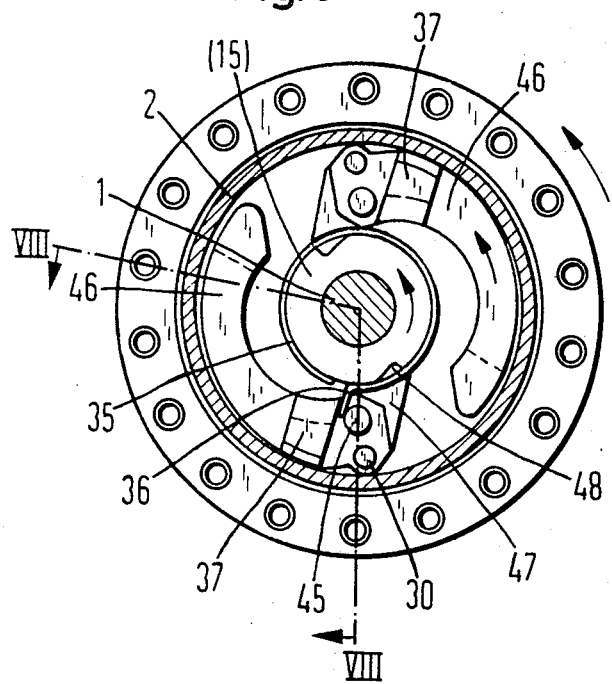
FIG. 9 is a radially sectional view of the apparatus of FIG. 8 taken on the line IX—IX.

The shifted spring portion 36 engages the hook portion 38 in circumferential abutment during relative angular movement of the pawl carrier 15, 17 and the flyweight carrier 27, and the frictional drag of the spring 35 on the pawl carrier 15, 17 causes the two coupled flyweights to swing on their pivot pins 45 so that the free ends of the flyweights move outwardly away from the hub axis into the positions seen in FIGS. 9 and 10 against the restraint of their return springs 34. As shown in phantom view in FIG. 10, the withdrawn sleeve portion 15 of the pawl carrier cannot prevent the radially inward movement of the spurs 47 which accompanies the outward movement of the main portion of each flyweight.

As described in more detail with reference to FIGS. 1-4, the flyweights 46 are coupled to each other by a disc 31 and turn the disc in such manner as to release the pawls 32 when they move from the position of FIG. 6 to that of FIG. 9. In the latter position of the pawls, the hub operates at its higher transmission ratio independent of the centrifugal governor 26'. When the pull rod 24a is shifted further to the left from the position seen in FIG. 8, the spring 35 releases the flyweights 46, and the transmission ratio of the bicycle hub is controlled by the speed of the flyweight carrier 27.

When the pull rod 24a is permitted to move toward the position seen in FIG. 5 under the urging of its return spring 41, the conically tapering rim 49 of the sleeve portion 15 cammingly engages the cam face 48 of each flyweight 46, and shifts the flyweights to the retracted position of FIGS. 5 to 7 if they were initially in a different position.

When shifting from higher to lower speed is desired, it is necessary to reduce the pedaling speed briefly or to stop pedaling momentarily so that the pawls 32 are disengaged from the teeth of the ring 33 and may be retracted toward the hub axis by the control disc 31.

Back pedaling is permissible at all times and for an unlimited time except during manual shifting of the pull rod 24a.

While shifting from one mode of operation to another is initiated by axial movement of the pull rod 24a and of the pawl carrier 15, 17, the axially movable parts are relatively few and simple, and the elements which are actually involved in the shifting process move in radial paths only and are therefore very simple and capable of extended operation without significant wear.

It should be understood, of course, that the foregoing disclosure relates only to preferred embodiments of the invention, and that it is intended to cover all changes and modifications in the examples of the invention herein chosen for the purpose of the disclosure which do not constitute departures from the spirit and scope of the invention set forth in the appended claims.

What is claimed is:

1. In a multiple-speed hub for a bicycle and the like having a driver member rotatable about an axis of rotation, a hub shell member, said driver member and said hub shell member constituting a pair of members, a multiple-speed transmission operatively interposed between said members and including two transmission elements rotating at different speeds during rotation of said driver member, and two clutch means interposed between said elements respectively and said hub shell member for rotating the hub shell member about said axis at either one of said different speeds, centrifugal governor means including a flyweight operatively connected to one of said members for simultaneous rotation about said axis and movable toward and away from said axis between two radial positions under centrifugal forces, said governor means shifting one of said clutch means between an engaged condition and a disengaged condition in response to said movement of the flyweight, and manual override means for shifting said one clutch means between said conditions thereof and for simultaneously deactivating said governor means, the improvement in the override means which comprises:
   a. a carrier member;
   b. moving means for moving said carrier member relative to said flyweight between a plurality of axial positions and a plurality of angular positions relative to said axis;
   c. an abutment member mounted on said carrier member in frictional engagement with the same; and
   d. abutment means on said flyweight engageable with said abutment member during relative angular movement of said flyweight and of said carrier member while said carrier member is in one of said axial positions for preventing said movement of the flyweight and for thereby holding said one clutch means in one of said conditions thereof.

2. In a hub as set forth in claim 1, said abutment member being a spring having one portion circumferentially extending about said carrier member in frictional engagement with the same and another portion radially projecting from said one portion for engagement with said abutment means.

3. In a hub as set forth in claim 1, said override means further comprising cooperating blocking means on said carrier member and on said flyweight engageable in another axial position of said sleeve member for blocking movement of the flyweight away from the other radial position thereof.

4. In a hub as set forth in claim 3, said flyweight when in said other radial position being nearer said axis than in said one radial position.

5. In a hub as set forth in claim 1, another one of said clutch means including a pawl member mounted on said carrier member, and ratchet means on said hub shell engageable with said pawl member.

6. In a hub as set forth in claim 1, in which the governor means further includes a flyweight carrier rotatable about said axis and pivot means on said flyweight carrier securing said flyweight to said flyweight carrier for pivoting movement between said radial positions about a pivot axis spaced from said axis of rotation, said abutment means including an axial projection on said flyweight, said abutment member clearing said projection during said relative angular movement in another axial position of said carrier member.

7. In a hub as set forth in claim 6, said projection being hook-shaped and defining a pocket radially open toward said axis, said abutment member freely passing through said pocket in said other axial position of said carrier member.

8. In a hub as set forth in claim 6, cam means on a terminal portion of said flyweight remote from said pivot axis and engageable with said abutment member in said other axial position of said carrier member during said relative angular displacement for holding said flyweight in one of said radial positions thereof, and for thereby holding said one clutch means in the other one of said conditions thereof.

9. In a hub as set forth in claim 6, in which said governor means further includes another flyweight pivoted to said flyweight carrier for movement about another pivot axis oppositely spaced from said axis of rotation relative to said first-mentioned pivot axis, said flyweights extending about said axis of rotation is respective arcs of more than 180° in the radial position thereof adjacent said axis of rotation, respective circumferentially terminal portions of said flyweights being of reduced axial thickness and axially aligned in said adjacent position.

10. In a hub as set forth in claim 9, said flyweights each having a main portion extending from said pivot axis in one direction circumferential relative to said axis of rotation, a spur portion extending from said pivot axis away from said main portion, and cam means on said spur portion engaging said carrier member in a predetermined axial position of said carrier member and thereby holding said main portion near said axis of rotation.

11. In a hub as set forth in claim 10, said carrier member having an axially terminal, tapering rim portion engaging said cam means on said spur portion when said carrier member moves toward said predetermined position, and thereby moving said main portion toward said axis of rotation.

12. In a hub as set forth in claim 1, wherein said carrier member is substantially cylindrical about said axis of rotation, an axially terminal portion of said carrier member carrying a radial flange, another one of said clutch means including a pawl member mounted on said flange and ratchet means on said hub shell member, said moving means including coupling means engaging the other axially terminal portion of said carrier member and coupling the carrier member to said driver member.

* * * * *

UNITED STATES PATENT OFFICE
CERTIFICATE OF CORRECTION

Patent No. 3,701,292   Dated October 31, 1972

Inventor(s) HORST SCHULZ

It is certified that error appears in the above-identified patent and that said Letters Patent are hereby corrected as shown below:

In the heading, line /73/: change "Eichtel" to -- Fichtel --

Signed and sealed this 6th day of March 1973.

(SEAL)
Attest:

EDWARD M. FLETCHER, JR.
Attesting Officer

ROBERT GOTTSCHALK
Commissioner of Patents